(12) United States Patent
Roederer et al.

(10) Patent No.: US 8,606,436 B2
(45) Date of Patent: Dec. 10, 2013

(54) DEVICE AND METHOD FOR REGULATING THE HUMIDITY OF A FUEL CELL

(75) Inventors: Karsten Roederer, Hamburg (DE); Hansgeorg Schuldzig, Jork (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/553,966

(22) Filed: Jul. 20, 2012

(65) Prior Publication Data

US 2013/0024051 A1 Jan. 24, 2013

Related U.S. Application Data

(63) Continuation of application No. PCT/EP2011/050783, filed on Jan. 20, 2011.

(60) Provisional application No. 61/297,465, filed on Jan. 22, 2010.

(30) Foreign Application Priority Data

Jan. 22, 2010 (DE) .......................... 10 2010 005 400

(51) Int. Cl.
*G01C 23/00* (2006.01)

(52) U.S. Cl.
USPC ............................................................. 701/3

(58) Field of Classification Search
USPC ........................ 701/3; 429/429–432
See application file for complete search history.

(56) References Cited

U.S. PATENT DOCUMENTS

| | | | |
|---|---|---|---|
| 5,655,364 A * | 8/1997 | Ma ................................... | 60/284 |
| 6,214,487 B1 | 4/2001 | Kelley et al. | |
| 6,376,111 B1 | 4/2002 | Mathias et al. | |
| 6,762,587 B1 | 7/2004 | Barbetta | |
| 7,270,900 B2 | 9/2007 | Lecky | |
| 7,279,874 B2 * | 10/2007 | Masuda ........................ | 323/282 |
| 2005/0048336 A1 | 3/2005 | Takebe et al. | |
| 2005/0135132 A1* | 6/2005 | Masuda ........................ | 363/142 |
| 2007/0196708 A1 | 8/2007 | Yoshida et al. | |
| 2008/0187785 A1* | 8/2008 | Kwok ............................. | 429/12 |

FOREIGN PATENT DOCUMENTS

| | | |
|---|---|---|
| DE | 10226339 A1 | 12/2003 |
| JP | 2003346850 A | 12/2003 |
| JP | 2005166601 A | 6/2005 |

OTHER PUBLICATIONS

German Patent Office, German Office Action dated Sep. 14, 2010 for German Patent Application No. 10 2010 005 400.3.
German Patent Office, German Office Action dated Apr. 25, 2012 for German Patent Application No. 10 2010 005 400.3.
International Searching Authority, International Search Report dated Apr. 14, 2011 for International Application No. PCT/EP2011/050783.

* cited by examiner

*Primary Examiner* — Mary Cheung
*Assistant Examiner* — Anne Mazzara
(74) *Attorney, Agent, or Firm* — Ingrassia Fisher & Lorenz P.C.

(57) ABSTRACT

A device and a method for controlling the air humidity in a fuel cell detect a step response in the output voltage of a fuel cell when the supply to electrical loads is interrupted, and determine parameters of the dynamic time characteristic from the detected step response, and thus calculate a capacitance of the fuel cell. As a function of any deviation from a predetermined capacitance, a humidity control unit is caused to increase or decrease the humidity. This makes in situ detection of the humidity balance of a fuel cell possible, and this can keep the electrical power thereof constant for a relatively long period, and this can increase the intervals between maintenance.

17 Claims, 5 Drawing Sheets

DEVICE AND METHOD FOR REGULATING THE HUMIDITY OF A FUEL CELL

CROSS-REFERENCE TO RELATED APPLICATIONS

This is a continuation of International Application No. PCT/EP2011/050783, filed Jan. 20, 2011, which application claims priority to U.S. Provisional Patent Application No. 61/297,465, filed Jan. 22, 2010, and to German Patent Application No. 10 2010 005 400.3, filed Jan. 22, 2010, which are hereby incorporated by reference in their entirety.

TECHNICAL FIELD

The technical field relates to a device for controlling the air humidity of a fuel cell, a fuel cell system, a method for controlling the air humidity of a fuel cell, the use of a fuel cell system of this type in an aircraft, and an aircraft comprising at least one engine, at least one electrical load and at least one fuel cell system.

BACKGROUND

Nowadays, fuel cells comprising electrodes which are separated from one another by a membrane or an electrolyte are increasingly being used for obtaining electrical energy from chemical energy sources. Low-temperature proton exchange membrane fuel cells (PEMFCs) may comprise gastight, proton-conducting ion membranes, which are produced for example from a sulphonated tetrafluoroethylene polymer (PTFE). Membranes of this type are also known by the name "Nafion® membranes."

For the highly sensitive membranes, it is necessary to maintain a sufficient water content and thus a constant humidity of the reaction gases, in such a way that the integrity of the membranes can be ensured throughout the operation of the fuel cell. In the prior art, the air humidity in fuel cell systems or fuel cell stacks is conventionally controlled in accordance with empirical values by means of a humidity control unit, which sets the humidity of the incoming air of the fuel cell as a function of operating parameters of the fuel cell, for example the current which is drawn, in accordance with a "feed forward" principle, and optionally also dehumidifies the fuel cells.

Since, in a conventional humidity control system, no information relating to the prevailing humidity level is taken into account in setting the parameters, it is important not to fall below a minimum humidity, so as to maintain a sufficient humidity so as to protect the sensitive membrane. As a result, a conventional humidity control system has a tendency to bring about an excessively high humidity, which can lead to a reduction in the performance of the fuel cell. An in situ capacitance measurement or humidity measurement of the membranes (during operation) by means of external thermodynamic process variables, voltage and current is not possible. In addition, other objects, desirable features and characteristics will become apparent from the subsequent summary and detailed description, and the appended claims, taken in conjunction with the accompanying drawings and this background.

SUMMARY

According to various aspects, a device for controlling the air humidity of a fuel cell is provided. The device makes possible a precise adjustment of the air humidity over a relatively long operating period, without the fuel cell having a tendency to become too wet or too dry during operation and without the electrical power supply from the fuel cell being interrupted.

In the description of the present disclosure, it is assumed that the fuel cell comprises a humidity control unit which is set up so as to set an air humidity in the fuel cell. It is further assumed that this humidity control unit can be controlled from the outside, in such a way that it is possible to implement a predetermined air humidity by means of a corresponding signal. In the prior art, there is a wide range of humidity control units, which can for example humidify the incoming air which is passed to a fuel cell and in some cases can also dehumidify a cathode chamber or the like. The subject-matter of the present disclosure does not relate to the specific technical implementation of the humidity control unit, but rather to determining the necessary parameters for setting the humidity precisely, and with these parameters actuating a humidity control unit in such a way that there is as precise a humidity as possible in the fuel cell.

In accordance with one exemplary embodiment, the device comprises at least one processor unit and at least one detection unit for controlling the air humidity in a fuel cell, the processor unit comprising a first signal input, which is set up for connection to a signal from the detection unit, and a first signal output, which is set up for connection to a control input of a humidity control unit of the fuel cell. The detection unit comprises at least a first voltage input, which is set up for connection to the fuel cell and for detecting the output voltage of the fuel cell, the processor unit additionally being set up so as to determine a time constant of the fuel cell from the voltage progression in the fuel cell and to actuate the humidity control unit as a function of the determined time constant.

The detection unit may in the simplest case be configured as an A/D converter, which can detect an analogue voltage at the first voltage input thereof and supply a voltage value, which is converted into digital data, at a first data output of the processor unit. Depending on the time constant which is to be expected, a corresponding precision of the A/D converter is necessary, and this is determined, for example, by way of a sampling frequency (sampling rate) and resolution.

To explain in greater detail the various aspects of the present disclosure, it should first be noted that a fuel cell may in principle be represented by an equivalent circuit diagram, in which a membrane resistance, which is determined from the material of a membrane and the physical constraints, a charge transfer resistance and a double-layer capacitance are linked to one another. In this context, the charge transfer resistance and the double-layer capacitance are connected in parallel, whilst the membrane resistance is connected in series with this parallel connection. The total resistance of the equivalent circuit diagram may be referred to as the polarisation resistance.

The membrane, which separates two gas chambers from one another, conducts the protons which are required for the complete reaction from a hydrogen side to an air side. In addition to the possibility of water transport, the membrane is also able to absorb water, the water content of the membrane generally tending towards equilibrium with the ambient humidity. In general, the proton conductance increases as the water content of the membrane increases. The ohmic resistance which is referred to as the "membrane resistance" in the description of the present disclosure is ultimately determined by the proton conductance of the membrane, the electron conductance of a diffusion layer, which is optionally arranged on the electrode and which provides improved distribution of the reaction gases and simultaneously dissipates the drawn current, and the electron conductance of a gas channel structure, which may be integrated into electrically conductive end plates for supplying the fuel cell with the reaction gases. Unlike the proton conductance in the membrane, the electron conductance may generally be considered to be substantially constant. The membrane resistance increases exponentially with decreasing humidity.

The reactions in the fuel cell take place in two electrodes (an anode and a cathode). At the phase boundary, two electrical potentials oppose one another, and as a result, an electrochemical double layer is formed having a double-layer capacitance which is substantially dependent on the geometric construction of the fuel cell, but is also dependent on the humidity of the fuel cell.

The polarisation resistance is therefore generally dependent on the humidity of the fuel cell, and generally has a characteristic progression for each type of fuel cell.

The fuel cell and the equivalent circuit diagram which represents it can have a non-linear time characteristic, which can be characterised by the above-mentioned components and as a result of which an output voltage across the fuel cell reacts, for example, generally aperiodically to a step change in a drawn current which is caused by electrical loads, but remains constant for a constant drawn current. The capacitive properties, which are linked to the storage of energy and therefore exhibit a time-delayed characteristic corresponding to a PT1 component, are generally pronounced. The dynamic characteristic of the fuel cell can therefore be defined by a humidity-dependent time constant. The aim of the device according to the present disclosure is thus to use this dynamic characteristic so as to be able to set the humidity control in an optimum manner.

According to the present disclosure, a detection unit is connected to the fuel cell so as to detect the output voltage, which in the stationary case will be substantially constant, across said cell. To identify the time constant which substantially instantaneously prevails in the relevant fuel cell, it can be necessary to analyse the dynamic characteristic of the fuel cell. Since fluctuating drawn currents of this type, which make it possible to determine a dynamic characteristic unambiguously, are not generally to be expected in stationary operation, according to the present disclosure a short interruption is provided between the fuel cell and the electrical loads, and the output voltage taken from the fuel cell is detected in the form of a step response and evaluated. This characteristic falling progression, which occurs at least in some cases with an exponential function, is passed from the detection unit to the processor unit, which determines the time constant therefrom.

Mathematical methods for analysing step responses so as to determine parameters of a dynamic system are generally well known from the prior art.

The aim of the method is to make a comparison between a prevailing time constant determined by measurement, or a dimensionless variable t of the fuel cell which is similar to a time constant, and an initial time constant, or a dimensionless value of the same fuel cell which is similar to a time constant and which may be determined, for example, directly after the manufacture of the fuel cell under ideal humidity conditions. By means of this comparison, fluctuations in the time constant can be detected which make it possible to draw a conclusion as to the instantaneous humidity level. A decreasing response time may, for example, be indicative of an excessive humidity.

The control strategy may be set up in such a way that initially the humidity of the fuel cell is successively increased while observing the time constant, until the time constant becomes worse, that is to say decreases. Subsequently, the humidity may be reduced again in a stepped manner, until no further improvement in the time constant is possible. Subsequent to this, the humidity is increased again until the time constant decreases again. As a result, the humidity oscillates about the generally optimum value thereof.

In the case of a fuel cell stack composed of a plurality of fuel cells, the entire stack can be controlled in accordance with this strategy, while observing the generally "worst" individual time constant of any one of the fuel cells. This provides that the humidity within the fuel cell stack is at the optimum humidity limit when assessed globally.

In accordance with the present teachings, the processor unit is set up so as to determine at least the capacitance and/or the membrane resistance of the fuel cell, as well as a time constant or a dimensionless value t which is similar to a time constant. This may be provided in that the step response of the voltage of a fuel cell when loads are suddenly switched off is divided substantially into two parts. A first rapid voltage build-up, in which charging of the double layer, kinetic processes and mass transport processes are not to be expected, is characteristic of ohmic losses, which can be attributed to the membrane resistance. This may be calculated from the quotients of the first rapid voltage build-up and the current difference. Depending on the construction and size of the fuel cell, the step change in the output voltage may turn out larger or smaller, in such a way that the membrane resistance can only be determined relatively precisely by this method if the voltage progression is pronounced.

The further progression of the step response of the voltage is dominated by the dynamic characteristic of the double-layer capacitance of the fuel cell, and corresponds, when globally assessed, to a first-order delay component, which may be determined by using an exponential function.

According to various exemplary embodiments of the present disclosure, the processor unit comprises a second signal output, which is connected to an interrupter unit. The interrupter unit is set up so as to interrupt the voltage output of the fuel cell for a predetermined period T. This has the result that during regular operation of the fuel cell a voltage progression, which is necessary for determining the time constant, can be determined, it being possible to actuate the interrupter unit generally automatically and at predetermined time intervals. This provides permanent monitoring of the state of the fuel cell.

According to various exemplary embodiments of the present disclosure, a plurality of detection units are used and can be connected to a set of a plurality of fuel cells in the form of one or more fuel cell stacks, and the processor unit can be set up so as to interrupt the connection between all of the fuel cells, individually or in groups, and the electrical loads for a period T by way of an interrupter unit. The processor unit is accordingly generally set up so as to determine all of the voltage progressions of all of the fuel cells during the interruption period T. Naturally, in this case the processor unit is also set up so as to determine the respective time constants from the determined voltage progressions by the above-mentioned method.

According to various exemplary embodiments of the present disclosure, a detection unit can be connected to a plurality of fuel cells which are interconnected to form a group, and detects the voltage progression of the group of fuel cells. This reduces the complexity of the device according to the present disclosure, for example, in fuel cell stacks which comprise a high number of individual fuel cells.

According to various exemplary embodiments of the present disclosure, the processor unit is set up so as to compare the determined time constant of the fuel cell with a predetermined time constant of the fuel cell, and to actuate the humidity control unit so as to alter the humidity if the deviation from the predetermined time constant is greater than a predetermined tolerance. In this way, it can be ensured that the predetermined time constant of the fuel cell always prevails, and the fuel cell can also provide a substantially constant power over a relatively long period.

According to various exemplary embodiments of the present disclosure, the processor unit is set up so as to determine the membrane resistance at the membrane of the fuel cell by means of the above-mentioned properties, and to increase the humidity if a predetermined membrane resistance is exceeded. Since the fuel cells cannot be manufactured so that all of the membranes always have the same humidity, this is an option for prolonging the maximum power of an aggregation of fuel cells.

According to various exemplary embodiments of the present disclosure the device comprises a buffer, which is set up so as to supply the electrical loads with electrical voltage for the period T when the connection between them and the fuel cell is interrupted. Depending on the length of the period T and the level of the static drawn current, the buffer may be of various types. If a relatively long period T for the interruption is necessary as a result of large fuel cells and thus relatively large time constants, the buffer may, for example, be configured as a battery or the like, whilst for very short periods T, a capacitor having a sufficiently high capacitance would also suffice.

In one exemplary embodiment of the present disclosure, the interruption period T is between about 50 and about 150 ms. The time constant of the fall in voltage of the fuel cell, which has to be covered by the detection unit, is often very small depending on the value of the double-layer capacitance, and can be in the range of less than about one second. If a large number of fuel cells is currently available, for example for use in a fuel cell stack, an interruption of this duration is sufficient so as to be able to determine a characteristic voltage progression and thus also a capacitance and other parameters.

In another exemplary embodiment, the interruption period T is between about 150 and about 500 ms. An interruption period T which is extended in this manner may be provided for detecting voltage progressions of relatively large fuel cells, whilst conversely the precision requirements on the detection units may also be reduced.

According to another exemplary embodiment, a low-resistance electrical shunt resistor (also referred to as a "shunt") is used so as to be able to determine the current provided by the fuel cell or the current drawn by the electrical loads. The device according to the present disclosure may further be set up so as to determine target and actual time constants for various drawn currents and to compare them with one another while taking the current into account.

According to various exemplary embodiments of the present disclosure, a method for controlling the air humidity of a fuel cell is provided. The method substantially comprises the features of interrupting the connection between the fuel cell and the electrical loads, detecting the output voltage of the fuel cell for a period T, determining a time constant of the fuel cell, comparing the time constant with a predetermined time constant, and altering the humidity of the fuel cell. Determining a double-layer capacitance of the fuel cell and/or a membrane resistance may also additionally be provided.

Further provided according to various aspects is a computer program product which, when it is executed by a processor unit, can cause the processor unit to carry out the method according to the present disclosure.

Also provided according to various exemplary embodiments is a fuel cell system, which comprises a stack of a plurality of fuel cells, on which at least one detection unit is arranged, which is connected to a processor unit. The fuel cell system according to the present disclosure further comprises an interrupter unit, which can be actuated by the processor unit in such a way that the voltage supply to the electrical loads from the fuel cell system according to the present disclosure is interrupted for a period T. Optionally, the fuel cell system according to the present disclosure further comprises a buffer, which provides the current supply of the electrical loads for the interruption period T.

According to various aspects of the present disclosure, also provided is a fuel cell system for use in an aircraft and by an aircraft comprising at least one electrical load and at least one fuel cell system according to the present disclosure.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1A:
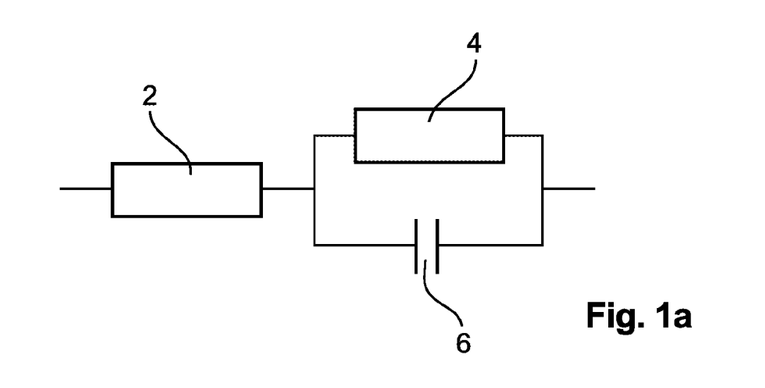
FIG. 1a to 1c show an equivalent circuit diagram of a fuel cell, the specific conductance of a membrane and a polarisation curve.

FIG. 1a shows a possible, simplified equivalent circuit diagram of a fuel cell, which comprises an ohmic membrane resistance 2, an ohmic charge transfer resistance 4 and a double-layer capacitance 6, the charge transfer resistance 4 and the double-layer capacitance 6 being connected in parallel and being connected in series with the membrane resistance 2. The dynamic relationship between the drawn current and the output voltage can be seen clearly from the equivalent circuit diagram.

Figure 1B:
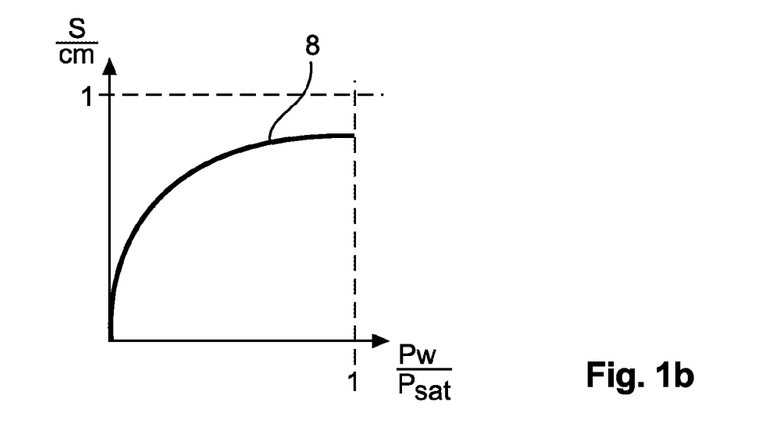

FIG. 1b shows the relationship between the conductance of a membrane of a PEM fuel cell and the amount of water absorbed (humidity of the membrane) in the form of a conductance curve 8, the humidity being given by the quotient of the water vapour partial pressure $p_w$ and the saturation partial pressure $p_{sat}$. As the humidity increases, a generally asymptotic approach to a maximum value can be seen, and it can be seen that the conductance deteriorates drastically at a low humidity of less than about 30%.

Figure 1C:
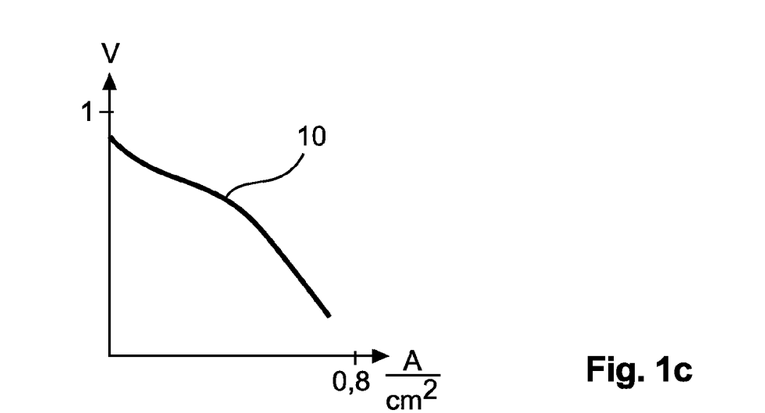

FIG. 1c shows what is known as the polarisation curve 10, which shows the relationship between the output voltage and the current density in A/cm². The polarisation curve for a high relative humidity of the hydrogen supplied to the fuel cell leads to the high effectiveness of the fuel cell.

Figure 2:
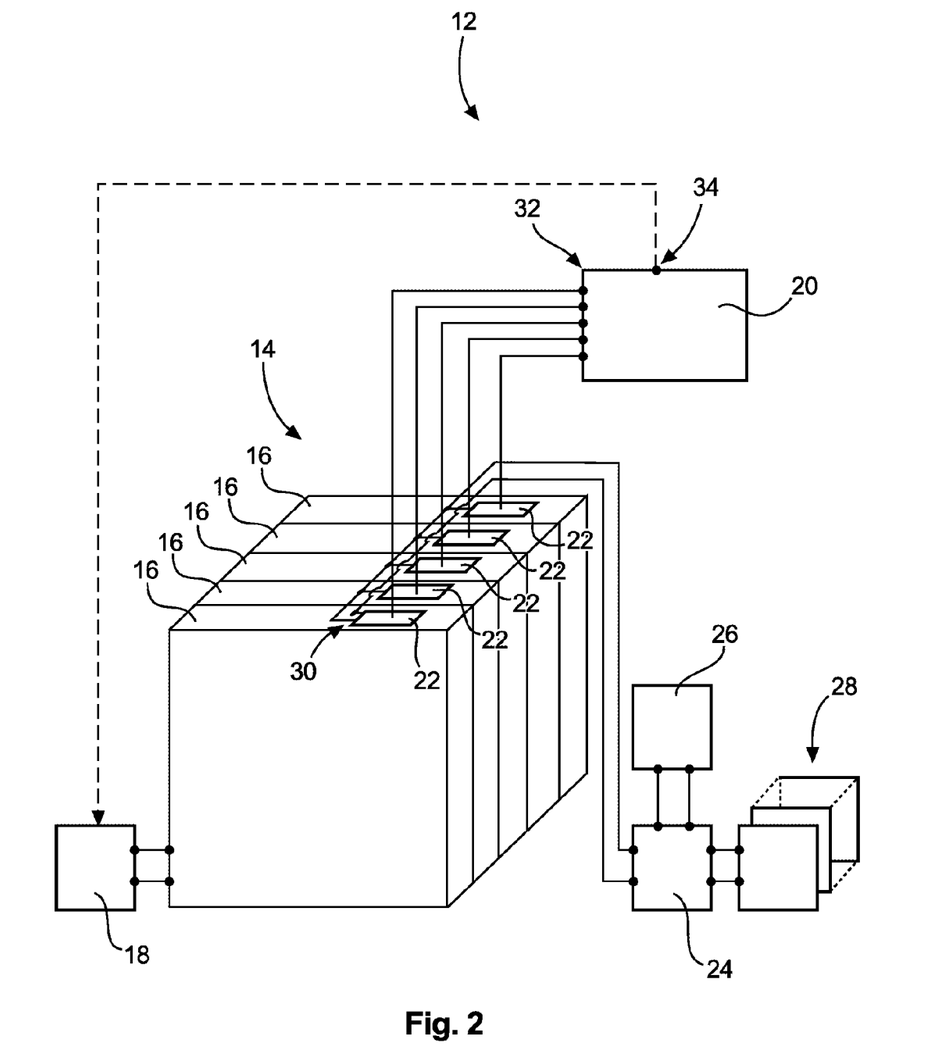
FIG. 2 is a schematic view of the device according to the various aspects of the present disclosure.

FIG. 2 shows a fuel cell system 12 according to the present disclosure, which comprises a fuel cell stack 14 (shown schematically) comprising a plurality of fuel cells 16 and a humidity control unit 18, a processor unit 20, a plurality of detection units 22, which are arranged on the individual fuel cells 16, an interrupter unit 24, and a buffer 26. Electrical loads 28 are connected to the fuel cell stack 14 via the interrupter unit 24, and can be coupled to the buffer 26, which is also connected to the interrupter unit 24, when the interrupter unit 24 is activated. At this point, it should be noted that the device according to the present disclosure for controlling the humidity in a fuel cell comprises all of the components of the fuel cell system 12 of FIG. 2, except generally for the fuel cell stack 14 and the electrical loads 28.

The fuel cells 16 of the fuel cell stack 14 are generally implemented as low-temperature proton exchange membranes and are humidified by the humidity control unit 18 in such a way that the membranes of the fuel cells 16 do not dry out and have a maximum proton conductance. In this way, the fuel cells 16 can provide a maximum power without the risk of the sensitive membrane drying out and being damaged. In this context the type of humidity control unit is irrelevant. In the prior art there is a range of humidity units, which bring about substantially complete saturation of the reaction gases with water vapour, and in some cases also actively remove reaction water from a cathode chamber or the like. The fuel cell system 12 according to the present disclosure can be operated with virtually any desired type of humidity control unit 18, which can be influenced in terms of the operation thereof from the outside in any desired manner, generally by way of a corresponding signal input or by means of a mechanical adjustment, which can be triggered by way of an actuator by means of a signal.

According to the present disclosure, when the fuel cell system 12 is in operation, by means of the processor unit 20 the interrupter unit 24 is manually or automatically caused, at predetermined time intervals, to separate the electrical loads 28 physically from the fuel cells 16 for a predetermined period T, in such a way that the fuel cells 16 each provide a falling voltage, which constitutes the step response to the step change in the drawn current, at the voltage outputs 30 thereof. By way of the detection units 22, which are generally configured as an A/D converter and which may be placed in the vicinity of the voltage outputs 30, the progressions of the respectively provided voltages of the individual fuel cells 16 can be detected and communicated to first signal inputs 32 of the processor unit 20.

Figure 3:
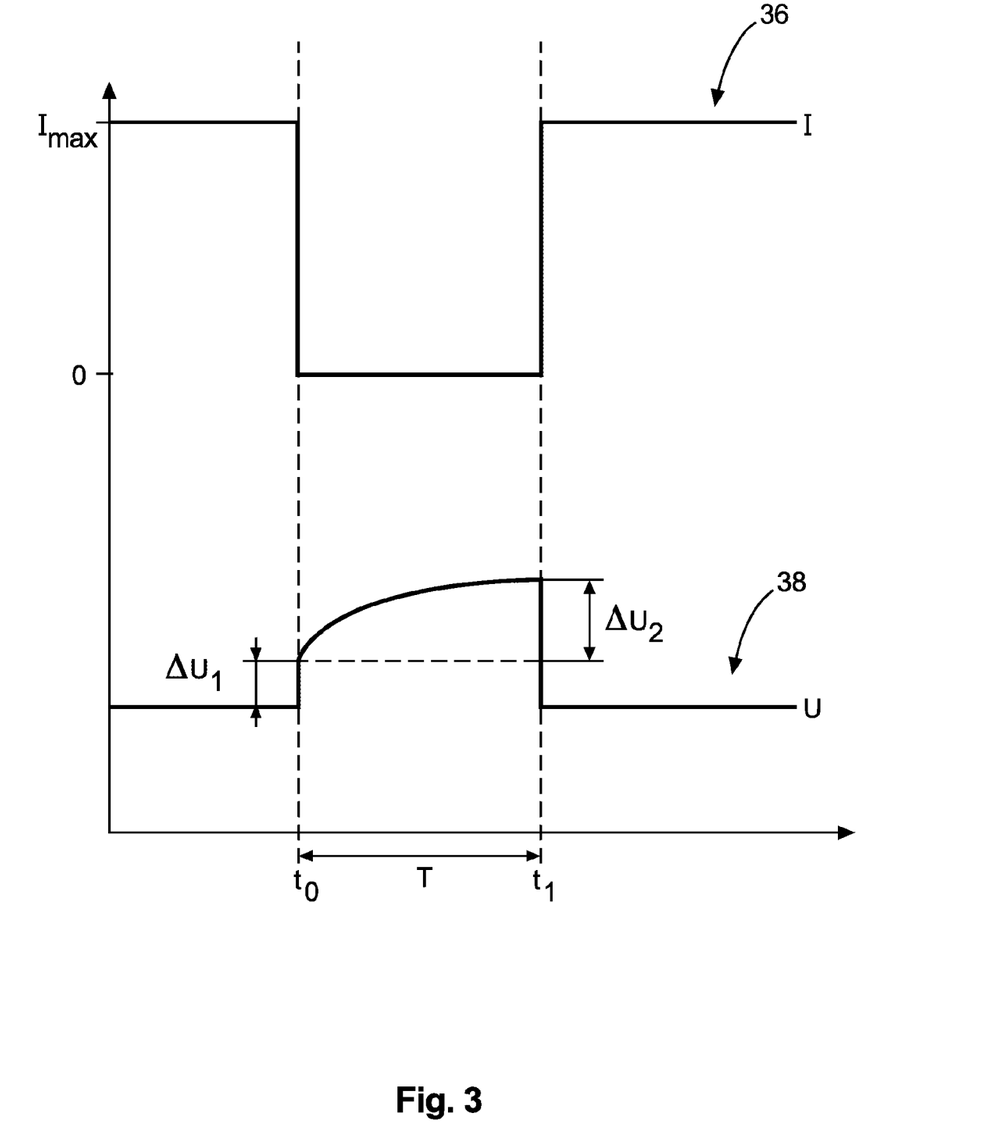
FIG. 3 is an example representation of a step response.

The processor unit 20 generally implements an algorithm which is adapted to determine the dynamic and static parameters of the equivalent circuit diagram of FIG. 1, as is illustrated in FIG. 3 by way of a corresponding diagram. Determining a time constant of the dynamic system of the fuel cells, or parameters derived therefrom, is of general importance for the control. The parameters can then be compared with parameters which have been detected, for example, in a fuel cell which is operated under ideal conditions. It may in general be sufficient to determine a dimensionless value τ, which represents a delay or a time constant, so as to compare this τ with predetermined values of τ for "fresh" fuel cells, which are determined directly after the production thereof under ideal conditions. Further, it may also be advantageous to determine as a function of the drawn current a set of different τ's, which are subsequently compared with the instantaneously determined τ in accordance with the instantaneous drawn current.

The humidity of the fuel cell may also be increased for example successively, while observing the time constant or parameters which are derived therefrom, until the time constant decreases. A stepped reduction in the humidity may subsequently be provided until no further improvement in the time constant is possible. Subsequent to this, the humidity may be increased again until the time constant decreases again, in such a way that the humidity oscillates about an optimum value thereof.

Alternatively or in addition, values of a membrane resistance and/or a double-layer capacitance and/or a charge transfer resistance may also be determined. A membrane resistance, which is determined by way of the first, stepped part of a step response, may be analysed as to whether the membrane is too dry, and has an excessively low ion conductance and may also tear as a result of dryness.

By analysing the further progression of the step response, a value for the double-layer capacitance can be determined, from which a prediction for the instantaneous humidity can be derived. By comparing a determined capacitance with a predetermined capacitance, it can be established whether one or more of the fuel cells 16 has/have a capacitance which is outside an accepted tolerance, making it possible, for example, to conclude that there is excessive active humidification. If this is the case, the processor unit 20 provides a signal, which is transmitted via a first signal output 34 to the humidity control unit 18, so as to cause said unit to reduce the humidity by a predetermined amount. Since the fuel cell stack 14 can comprise a sequence of fuel cells 16, it is advantageous to equip all of the fuel cells 16 with a detection unit 22 each, in such a way that the processor unit 20 can also be able to process all of the data of all of the detection units 22. Generally, the step responses of all of the fuel cells 16 are analysed individually, so as to obtain all of the static and dynamic parameters of all of the fuel cells 16.

Since a humidity control unit 18 is often only able to provide the humidity of all of the fuel cells 16 in a fuel cell stack as a whole, it is generally not possible to humidify the individual fuel cells 16 separately. It is therefore necessary to optimise the humidity of the fuel cell stack 14 as a whole and not that of the fuel cells 16. In this context, it is generally ensured that the control of the humidity is not too low for any fuel cell 16, and thus does not trigger any membrane defect due to dryness. At the same time, the humidification must also not be excessive, in such a way that the powers of the fuel cells 16 decrease again as a result of the optimum humidity being exceeded. Accordingly, the humidity should in so far as possible be based on the generally "worst" fuel cell 16, which for example shows a largest deviation from predetermined target values or appears to be too dry.

In one example, the processor unit 20 is set up so as to store experimentally determined ideal static and dynamic parameters of a fuel cell 16 in a memory unit and to call them up as required, so as to be able to compare the determined static and dynamic parameters of the fuel cells 16 with the ideal parameters.

If the number of fuel cells 16 is relatively high, in such a way that a fuel cell 16 which is not operating entirely optimally is not particularly noticeable, it may also be advantageous to calculate a possible power of the fuel cell stack 14 from the determined static and dynamic parameters and to set the humidity in such a way that the possible power is maximised.

After the predetermined period T, the electrical loads 18 are connected to the fuel cell stack 14 again. After a further phase of conventional operation, the next interruption can be carried out for the period T, after which knowledge as to the change in the capacitances of the individual fuel cells 16 is available. Once all of the fuel cells 16 have a capacitance which is within the tolerance limit, the humidity can be considered substantially sufficient.

FIG. 3 is a schematic view of a discontinuous drawn current progression 36 with an ensuing step response in the form of a progression of an output voltage 38 of a fuel cell. The drawn current is at a maximum level until time $t_0$, that is to say electrical loads are supplied with current in the normal manner by the fuel cell 16. Subsequently, the current is interrupted for a period T, that is to say until a time $t_1$, and returns from the maximum value thereof to about 0. The step decrease in the current leads to a step response in the voltage, which initially increases substantially directly by an amount $\Delta U_1$, in a manner which is more or less easy to measure depending on the construction and installation size of the fuel cell. Subsequently, there is a more clearly delayed increase in the voltage by $\Delta U_2$, and this is interrupted when the loads are connected again and the current rises to $I_{max}$. If the amount $\Delta U_1$ can be substantially derived from the detected step response, the membrane resistance can be calculated therefrom as:

$$R_M = \frac{\Delta U_1}{I_{max}}.$$

If because of the construction or installation size there is a negligible or barely measurable step voltage progression $\Delta U_1$, the analysis of the step response of the fuel cell 16 can be limited to merely determining a time constant from the delayed voltage change.

The increase in voltage over time for $\Delta U_2$ substantially adheres to the following equation:

$$\Delta U_2 = R_{ct}\left(1 - e^{\frac{t}{R_{ct}C_{dt}}}\right)I_{max},$$

wherein $R_{ct}$ is the charge transfer resistance and $C_{dt}$ is the double-layer capacitance. This equation may, for example, be solved by an iterative or analytical method, and provide information relating to the charge transfer resistance and the double layer capacitance. The equation may also be simplified in such a way that the charge transfer resistance and double-layer capacitance, which are connected in parallel, are determined as a whole and compared with a previously experimentally determined value.

Figure 4:
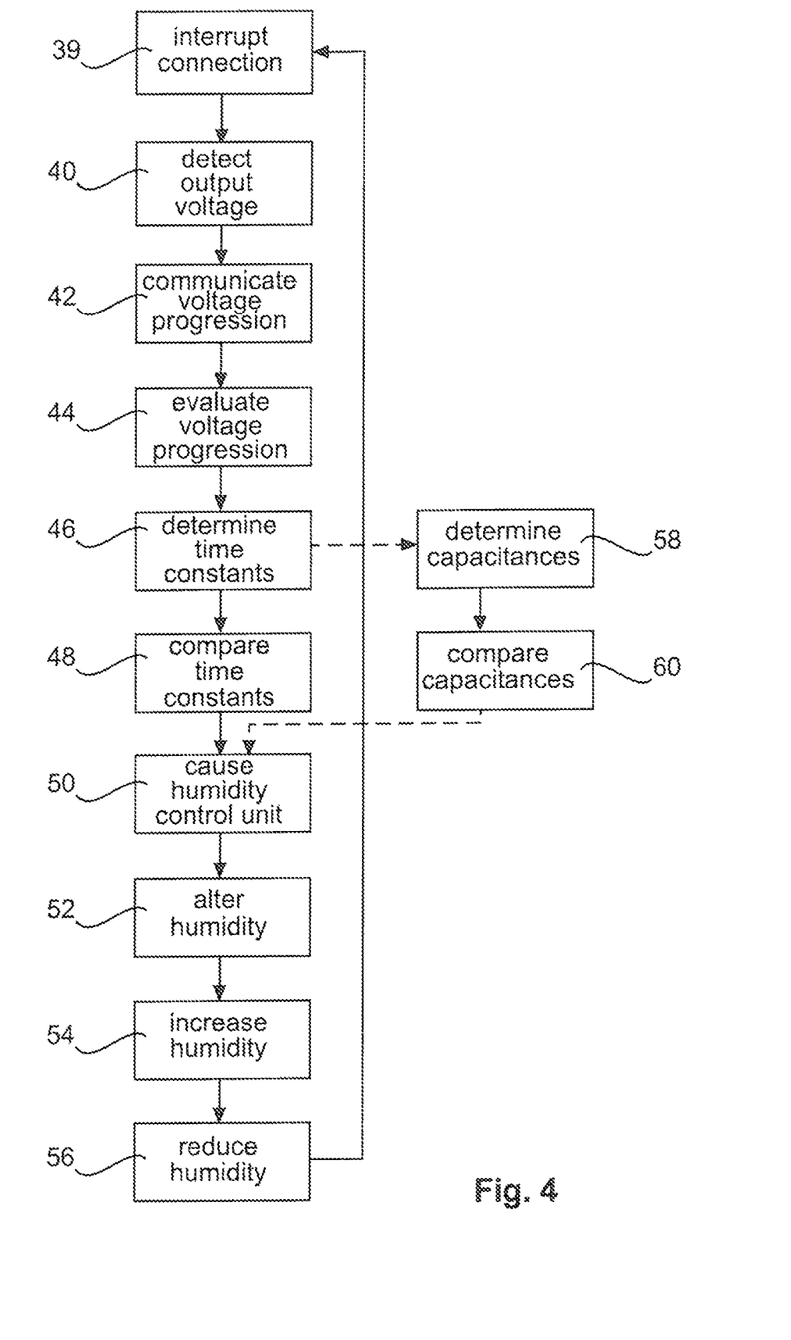
FIG. 4 is a block-type representation of the method according to the various aspects of the present disclosure.

FIG. 4 is a block-based representation of a method according to the present disclosure. During the operation of a fuel cell 16 or a fuel cell stack 14 comprising a plurality of fuel cells 16, the connection to electrical loads 28 is briefly interrupted 39 for a period T and the output voltage across the relevant fuel cells 16 is detected 40 by means of detection units 22. The detected voltage progressions are communicated 42 to a processor unit 20, which evaluates 44 the voltage progressions by means of a program so as to determine 46 the time constants of the dynamic system of the fuel cells. The time constants are compared 48 with predetermined time constants, and if the deviation from the predetermined time constants is beyond an acceptable limit, by way of at least one of the fuel cells 16, the processor unit 20 causes 50 a humidity control unit 18 to alter 52 the humidity of the fuel cells 16.

In addition, the humidity can be substantially constantly increased 54 until the time constant decreases. Subsequently, the humidity may be reduced again 56 in a stepped manner, until no further improvement in the time constant is possible. Subsequent to this, the above can be repeated, in such a way that the humidity constantly oscillates about the optimum value thereof.

Instead of considering the time constants, it would also be possible to determine 58 the capacitance of the equivalent circuit diagram of each of the fuel cells 16. The capacitances are compared 60 with a predetermined capacitance and the above method can be carried out. By the method according to the present disclosure, the humidity of a fuel cell 6 or a fuel cell stack 14 comprising a plurality of fuel cells can be controlled in such a way that none of the fuel cells 16 is too humid or too dry in such a way that the output power decreases.

Figure 5:
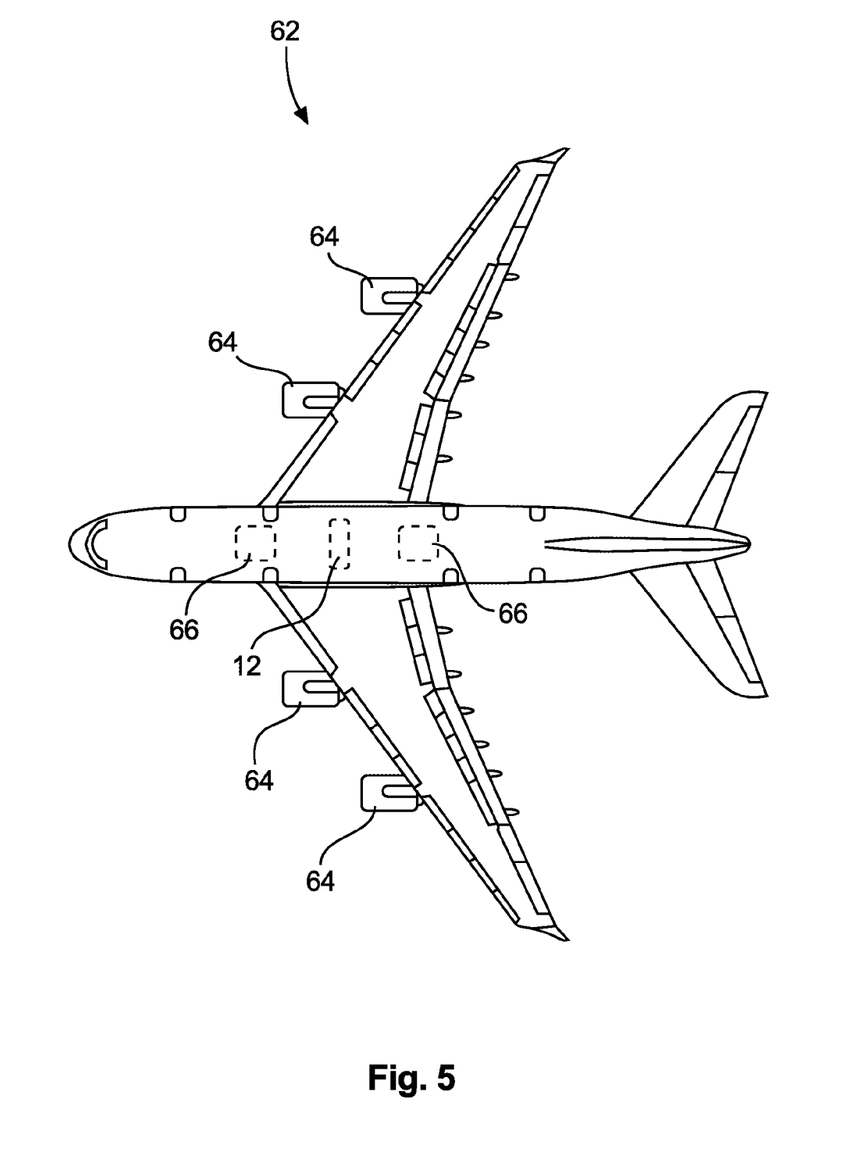
FIG. 5 shows an aircraft which is equipped at least with one fuel cell system according to the various aspects of the present disclosure.

Finally, FIG. 5 shows an aircraft 62, which comprises engines 64 and a plurality of electrical loads 66, as well as a fuel cell system 12 according to the present disclosure as shown in FIG. 2.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A device for controlling the air humidity in a fuel cell, comprising:
   at least one detection unit connected to the fuel cell that detects the output voltage of the fuel cell;
   at least one interrupter unit; and
   at least one processor unit connected to the interrupter unit and including a first signal input that is connected to a signal output of the detection unit, and a first signal output that is connectable to a control input of a humidity control unit of the fuel cell,
   wherein the processor unit interrupts the connection between the fuel cell and an electrical load for a time period T by triggering the interrupter unit and determines a time constant of the fuel cell from a step response of the voltage progression of the fuel cell and actuates the humidity control unit as a function of a deviation of the determined time constant from a predetermined time constant and the processor unit determines at least a double-layer capacitance and a charge transfer resistance of the fuel cell from the step response and compares the determined double-layer capacitance with a predetermined double-layer capacitance and actuates the humidity control unit as a function of a respective deviation.

2. The device according to claim 1, comprising a plurality of detection units for individually detecting the output voltage of a plurality of fuel cells of a fuel cell stack.

3. The device according to claim 1, wherein a detection unit is connected to a plurality of interconnected fuel cells.

4. The device according to claim 1, wherein the processor unit causes the humidity control unit to increase the humidity of the fuel cell when a predetermined time constant is achieved.

5. The device according to claim 1, further comprising a buffer for bridging the supply to the electrical load when the step response of the output voltage is determined.

6. The device according to claim 1, wherein the time period T is between about 50 ms and about 150 ms.

7. The device according to claim 1, wherein the time period T is between about 150 ms and about 500 ms.

8. The device according to claim 1, wherein the processor unit determines at least a membrane resistance of the fuel cell from the step response and compares the determined membrane resistance with a predetermined membrane resistance and actuates the humidity control unit as a function of a respective deviation.

9. A fuel cell system, comprising:
at least one fuel cell having a humidity control unit that includes a control input;
at least one detection unit connected to the at least one fuel cell that detects the output voltage of the fuel cell; and
at least one processor unit including a first signal input that is connected to a signal output of the detection unit, and a first signal output that is connected to the control input of the humidity control unit,
wherein the processor unit interrupts the connection between the fuel cell and an electrical load for a time period T and determines a time constant of the fuel cell from a step response of the voltage progression of the fuel cell and actuates the humidity control unit to increase the humidity of the fuel cell when a predetermined time constant is achieved, and the processor unit determines at least a double-layer capacitance and a charge transfer resistance of the fuel cell from the step response and compares the determined double-layer capacitance with a predetermined double-layer capacitance and actuates the humidity control unit as a function of a respective deviation.

10. The fuel cell system of claim 9, further comprising a buffer for bridging the supply to the electrical load when the step response of the output voltage is determined.

11. The fuel cell system according to claim 9, wherein the time period T is between about 50 ms and about 150 ms.

12. The fuel cell system according to claim 9, wherein the time period T is between about 150 ms and about 500 ms.

13. The fuel cell system of claim 9, further comprising at least one interrupter unit that interrupts the connection between the at least one fuel cell and an electrical load for the time period T when triggered by the processor.

14. The fuel cell system of claim 9, wherein the fuel cell system is employed on an aircraft.

15. A method for controlling the air humidity of a fuel cell, comprising:
interrupting a connection between the fuel cell and an electrical load for a time period T;
detecting a step response of the output voltage across the fuel cell by means of a detection unit;
communicating the detected voltage progression to a processor unit;
determining a time constant of the fuel cell by means of the processor unit;
determining at least a double-layer capacitance and a charge transfer resistance of the fuel cell from the step response;
comparing the time constant with a predetermined time constant and comparing the determined double-layer capacitance with a predetermined double-layer capacitance to obtain a deviation;
if the time constant is below the predetermined time constant beyond an acceptable limit, causing a humidity control unit to reduce the humidity of the fuel cell; and
actuating the humidity control unit as a function of a respective deviation.

16. The method according to claim 15, further comprising:
causing a humidity control unit to increase the humidity of the fuel cell when a predetermined time constant is achieved.

17. An aircraft comprising:
at least one engine;
at least one electrical load;
at least one fuel cell system, the at least one fuel cell system including:
a fuel cell stack including a plurality of fuel cells;
a humidity control unit coupled to the fuel cell stack that includes a control input;
a plurality of detection units each connected to a respective one of the plurality of fuel cells that detects the output voltage of each of the respective fuel cells;
a buffer that bridges the supply to the at least one electrical load; and
at least one processor unit including a first signal input that is connected to a signal output of the detection unit, and a first signal output that is connected to the control input of the humidity control unit,
wherein the processor unit interrupts the connection between the fuel cell stack and the at least one electrical load for a time period T, determines a time constant of each of the plurality of fuel cells from a step response of the voltage progression of each of the plurality of fuel cells and actuates the humidity control unit to change the humidity of the fuel cell stack when a predetermined time constant is achieved for a respective one of the plurality of fuel cells, and the buffer bridges the supply to the at least one electrical load when the connection between the fuel cell stack and the at least one electrical load is interrupted.

* * * * *